US012418789B2

(12) United States Patent
Li et al.

(10) Patent No.: US 12,418,789 B2
(45) Date of Patent: Sep. 16, 2025

(54) CAPABILITY REPORTING AND PROCESSING METHOD, DEVICE AND APPARATUS, AND MEDIUM

(71) Applicant: DATANG MOBILE COMMUNICATIONS EQUIPMENT CO., LTD., Beijing (CN)

(72) Inventors: Jianxiang Li, Beijing (CN); Ren Da, Beijing (CN); Haiyang Quan, Beijing (CN); Jing Fu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 426 days.

(21) Appl. No.: 17/924,574

(22) PCT Filed: Apr. 30, 2021

(86) PCT No.: PCT/CN2021/091415
§ 371 (c)(1),
(2) Date: Nov. 10, 2022

(87) PCT Pub. No.: WO2021/233117
PCT Pub. Date: Nov. 25, 2021

(65) Prior Publication Data
US 2023/0276226 A1    Aug. 31, 2023

(30) Foreign Application Priority Data

May 20, 2020    (CN) .......................... 202010429796.8

(51) Int. Cl.
*H04W 8/24*    (2009.01)
*H04W 76/28*    (2018.01)

(52) U.S. Cl.
CPC ............. *H04W 8/24* (2013.01); *H04W 76/28* (2018.02)

(58) Field of Classification Search
CPC ....... H04W 8/24; H04W 76/28; H04W 64/00; H04W 8/22; Y02D 30/70
See application file for complete search history.

(56) References Cited

U.S. PATENT DOCUMENTS

| 10,638,253 | B1 | 4/2020 | Parkvall et al. |
| 2014/0106774 | A1* | 4/2014 | Siomina ................ H04W 64/00 455/456.1 |

(Continued)

FOREIGN PATENT DOCUMENTS

| CN | 101621844 A | 1/2010 |
| CN | 110139263 A | 8/2019 |
| CN | 110972054 A | 4/2020 |

OTHER PUBLICATIONS

International Search Report for International Application No. PCT/CN2021/091415 issued on Jul. 27, 2021 and its English Translation provided by WIPO.
Written Opinion for International Application No. PCT/CN2021/091415 issued on Jul. 27, 2021 and its English Translation provided by WIPO.
International Preliminary Report on Patentability No. PCT/CN2021/091415, issued on Nov. 17, 2022 and its English Translation provided by WIPO.

(Continued)

*Primary Examiner* — Kibrom T Hailu
(74) *Attorney, Agent, or Firm* — Ladas & Parry, LLP

(57) ABSTRACT

This disclosure provides a capability reporting method, a capability report processing method, a device, an apparatus and a medium. The capability reporting method includes: reporting, by a terminal, proactively or in response to a request of a positioning server, a positioning signal processing capability for a period of discontinuous reception to a base station serving the terminal and/or to the positioning server. After allocating resources to the terminal according to the positioning signal processing capability for the period of discontinuous reception, the base station configures and sends to the terminal an indication indicating whether processing of a positioning reference signal is allowed during the period of discontinuous reception. A positioning server selects a positioning method for the terminal according to (Continued)

positioning service quality of service requirements and the positioning signal processing capability for the period of discontinuous reception.

13 Claims, 3 Drawing Sheets

(56) References Cited

U.S. PATENT DOCUMENTS

| | | | |
|---|---|---|---|
| 2019/0059069 A1* | 2/2019 | Kazmi | H04W 48/04 |
| 2019/0199503 A1* | 6/2019 | Son | H04W 80/08 |
| 2019/0327673 A1 | 10/2019 | Bitra et al. | |
| 2020/0196101 A1* | 6/2020 | Edge | H04W 12/06 |

OTHER PUBLICATIONS

"[108#85] UE capability on NR positioning" 3GPP TSG-RAN WG2 Meeting #109 electronic, R2-2000475, Elbonia, Feb. 24-Mar. 6, 2020, Agenda item: 6.8.2.3, Source: Intel Corporation.

"Introduction of UE positioning capabilities," 3GPP TSG-RAN WG2 Meeting #109b electronic, R2-2003317, Elbonia, Apr. 20-30, 2020, Source to WG: Intel Corporation, Source to TSG: R2, all pages.

"Discussion on positioning SRS during DRX inactive time," 3GPP TSG-RAN WG4 Meeting #95-e, R4-2007854, Electronic Meeting, May 25-Jun. 5, 2020, Source: Huaweu, HiSilicon, Agenda Item: 6.8.2.4, all pages.

First Office Action and search report for Chinese Patent Application 202010429796.8 issued on Mar. 21, 2022, and ts English translation provided by the Chinese Patent Office.

* cited by examiner

CAPABILITY REPORTING AND PROCESSING METHOD, DEVICE AND APPARATUS, AND MEDIUM

CROSS-REFERENCE TO RELATED APPLICATIONS

The present application is a U.S. national phase application of a PCT Application No. PCT/CN2021/091415 filed on Apr. 30, 2021, which claims a priority to the Chinese patent application No. 202010429796.8 filed in China on May 20, 2020, the disclosures of which are incorporated herein by reference in their entireties.

TECHNICAL FIELD

The present disclosure relates to the field of wireless communication technology, in particular to a capability reporting method, a capability report processing method, a device, an apparatus, and a medium.

BACKGROUND

FIG. 1 is a schematic diagram of a positioning architecture suitable for NG-RAN. As shown in the figure, a location management function (LMF) is a positioning server, which is responsible for selecting a positioning method and triggering corresponding positioning measurement, and can calculate the final positioning result and its accuracy.

Next Generation-radio access network (NG-RAN): it can send positioning reference signals or perform positioning measurement based on assistance information.

User equipment (UE): it can send positioning reference signals or perform positioning measurement based on assistance information; it can also calculate based on the measurement result the final positioning result and its accuracy.

Positioning capabilities in Long Term Evolution positioning protocol (LPP) include: positioning methods supported by a target device, different supported aspects of a positioning method (such as supported assistance data types of advanced global navigation satellite system (A-GNSS)), and some common positioning characteristics that are not limited to a certain positioning method (such as the capability to handle multiple LPP transactions).

A disadvantage of the related art is that there is no solution for supporting the terminal to transmit positioning reference signals during a DRX inactive period.

SUMMARY

The present disclosure provides a capability reporting method, a capability report processing method, a device, an apparatus, and a medium, to solve the problem of supporting a terminal to transmit a positioning reference signal during an inactive period of DRX.

An embodiment of the present disclosure provides a capability reporting method, including:
  reporting, by a terminal, a positioning signal processing capability for a period of DRX.
  In an implementation, the positioning signal processing capability for the period of DRX is reported by the terminal proactively or in response to a request of a positioning server.
  In an implementation, the terminal reports the positioning signal processing capability for the period of DRX to a base station serving the terminal and/or to the positioning server.

In an implementation, the positioning signal processing capability for the period of DRX includes one of or a combination of following capabilities:
  a capability of supporting uplink and downlink positioning signal processing during the period of DRX;
  a capability of supporting uplink positioning signal transmission during the period of DRX;
  a capability of supporting downlink positioning signal processing during the period of DRX;
  a capability of not supporting uplink and downlink positioning signal processing during the period of DRX;
  a capability of not supporting uplink positioning signal transmission during the period of DRX;
  a capability of not supporting downlink positioning signal processing during the period of DRX.

In an implementation, the capability reporting method further includes:
  processing or not processing, by the terminal, a positioning reference signal during the period of DRX according to a network configuration.

An embodiment of the present disclosure provides a capability report processing method, including:
  receiving, by a base station, a positioning signal processing capability for a period of DRX reported by a terminal, the base station being a base station serving the terminal;
  configuring and sending, by the base station, an indication to the terminal after allocating resources to the terminal according to the positioning signal processing capability for the period of DRX, the indication indicating whether processing of a positioning reference signal is allowed during the period of DRX.

In an implementation, the positioning signal processing capability for the period of DRX includes one of or a combination of following capabilities:
  a capability of supporting uplink and downlink positioning signal processing during the period of DRX;
  a capability of supporting uplink positioning signal transmission during the period of DRX;
  a capability of supporting downlink positioning signal processing during the period of DRX;
  a capability of not supporting uplink and downlink positioning signal processing during the period of DRX;
  a capability of not supporting uplink positioning signal transmission during the period of DRX;
  a capability of not supporting downlink positioning signal processing during the period of DRX.

An embodiment of the present disclosure provides a capability report processing method, comprising:
  receiving, by a positioning server, a positioning signal processing capability for a period of DRX reported by a terminal;
  selecting, by the positioning server, a positioning method for the terminal according to a positioning service QoS requirement and the positioning signal processing capability for the period of DRX.

In an implementation, the positioning signal processing capability for the period of DRX is proactively reported by the terminal, or is reported by the terminal in response to a request of the positioning server.

In an implementation, the positioning signal processing capability for the period of DRX includes one of or a combination of following capabilities:
  a capability of supporting uplink and downlink positioning signal processing during the period of DRX;
  a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In an implementation, the capability report processing method further comprises:

configuring the positioning method selected for the terminal to the terminal and a base station.

An embodiment of the present disclosure provides a terminal, including:

a processor, configured to read a program in a memory to implement following process:

reporting a positioning signal processing capability for a period of DRX;

a transceiver, configured to receive and transmit data under the control of the processor.

In an implementation, the positioning signal processing capability for the period of DRX is reported proactively or in response to a request of a positioning server.

In an implementation, the positioning signal processing capability for the period of DRX is reported to a base station serving the terminal and/or to the positioning server.

In an implementation, the positioning signal processing capability for the period of DRX includes one of or a combination of following capabilities:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In an implementation, the processor is configured to read the program in the memory to further implement:

processing or not processing a positioning reference signal during the period of DRX according to a network configuration.

An embodiment of the present disclosure provides a base station, including:

a processor, configured to read a program in a memory to implement following process:

receiving a positioning signal processing capability for a period of DRX reported by a terminal, the base station being a base station serving the terminal;

configuring and sending an indication to the terminal after allocating resources to the terminal according to the positioning signal processing capability for the period of DRX, the indication indicating whether processing of a positioning reference signal is allowed during the period of DRX;

a transceiver, configured to receive and transmit data under the control of the processor.

In an implementation, the positioning signal processing capability for the period of DRX includes one of or a combination of following capabilities:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

An embodiment of the present disclosure provides a positioning server, including:

a processor, configured to read a program in a memory to implement following process:

receiving a positioning signal processing capability for a period of DRX reported by a terminal;

selecting a positioning method for the terminal according to a positioning service QoS requirement and the positioning signal processing capability for the period of DRX;

a transceiver, configured to receive and transmit data under the control of the processor.

In an implementation, the positioning signal processing capability for a period of DRX is proactively reported by the terminal, or is reported by the terminal in response to a request of the positioning server.

In an implementation, the positioning signal processing capability for the period of DRX includes one of or a combination of following capabilities:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In an implementation, the processor is configured to read the program in the memory to further implement:

configuring the positioning method selected for the terminal to the terminal and the base station.

An embodiment of the present disclosure provides a capability reporting apparatus, including:

a reporting module, configured to report a positioning signal processing capability for a period of DRX.

In an implementation, the reporting module is further configured to report the positioning signal processing capability for the period of DRX proactively, or report the positioning signal processing capability for the period of DRX in response to a request of a positioning server.

In an implementation, the reporting module is further configured to report the positioning signal processing capability for the period of DRX to a base station serving the terminal and/or report the positioning signal processing capability for the period of DRX to the positioning server.

In an implementation, the reporting module is further configured to report one of or a combination of the following positioning signal processing capabilities for the period of DRX:

a capability of supporting uplink and downlink positioning signal processing during the period of DRX;

a capability of supporting uplink positioning signal transmission during the period of DRX;

a capability of supporting downlink positioning signal processing during the period of DRX;
a capability of not supporting uplink and downlink positioning signal processing during the period of DRX;
a capability of not supporting uplink positioning signal transmission during the period of DRX;
a capability of not supporting downlink positioning signal processing during the period of DRX.

In an implementation, the capability reporting apparatus further includes:
a processing module, configured to process or not process the positioning reference signal during the period of DRX according to a network configuration.

An embodiment of the present disclosure provides a capability report processing apparatus, including:
a base station receiving module, configured to receive a positioning signal processing capability for a period of DRX reported by a terminal, the base station being a base station serving the terminal;
a base station indication module, configured to configure and send an indication to the terminal after allocating resources to the terminal according to the positioning signal processing capability for the period of DRX, the indication indicating whether processing of a positioning reference signal is allowed during the period of DRX.

In an implementation, the base station receiving module is further configured to receive one of or a combination of the following positioning signal processing capabilities for the period of DRX:
a capability of supporting uplink and downlink positioning signal processing during the period of DRX;
a capability of supporting uplink positioning signal transmission during the period of DRX;
a capability of supporting downlink positioning signal processing during the period of DRX;
a capability of not supporting uplink and downlink positioning signal processing during the period of DRX;
a capability of not supporting uplink positioning signal transmission during the period of DRX;
a capability of not supporting downlink positioning signal processing during the period of DRX.

An embodiment of the present disclosure provides a capability report processing apparatus, including:
a positioning server receiving module, configured to receive a positioning signal processing capability for the period of DRX reported by a terminal;
a positioning server selection module, configured to select a positioning method for the terminal according to a positioning service QoS requirement and the positioning signal processing capability for the period of DRX.

In an implementation, the positioning server receiving module is further configured to receive the positioning signal processing capability for the period of DRX reported by the terminal proactively or the positioning signal processing capability for the period of DRX reported by the terminal in response to a request of the positioning server.

In an implementation, the positioning server receiving module is further configured to receive one of or a combination of the following positioning signal processing capabilities for the period of DRX:
a capability of supporting uplink and downlink positioning signal processing during the period of DRX;
a capability of supporting uplink positioning signal transmission during the period of DRX;
a capability of supporting downlink positioning signal processing during the period of DRX;
a capability of not supporting uplink and downlink positioning signal processing during the period of DRX;
a capability of not supporting uplink positioning signal transmission during the period of DRX;
a capability of not supporting downlink positioning signal processing during the period of DRX.

In an implementation, the capability report processing apparatus further includes:
a configuration module, configured to configure the positioning method selected for the terminal to the terminal and the base station.

An embodiment of the present disclosure provides a computer-readable storage medium, wherein the computer-readable storage medium stores a computer program configured to implement the foregoing capability reporting method and/or capability report processing method.

The beneficial effects of the present disclosure are as follows.

In the technical solutions provided by the embodiments of the present disclosure, since the terminal reports the positioning signal processing capability for the period of DRX, the positioning server can timely know the capability related to whether the terminal supports the reference signal processing in DRX, which assists in completing the determination of the positioning method; the base station can obtain the terminal's related capabilities and configure appropriate network parameters, thereby better supporting the positioning requirements of various 5G terminals.

Further, through the terminal's reporting of the capability related to reference signal processing during the period of DRX, it is not necessary to require all terminals to support or not support the positioning reference signal processing during the period of DRX, thereby increasing the diversity and processing flexibility of the terminal, and better adapting to the positioning requirements in the 5G vertical field.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an improper limitation on the present disclosure. The accompanying drawings are listed as below.

DETAILED DESCRIPTION

Figure 1:
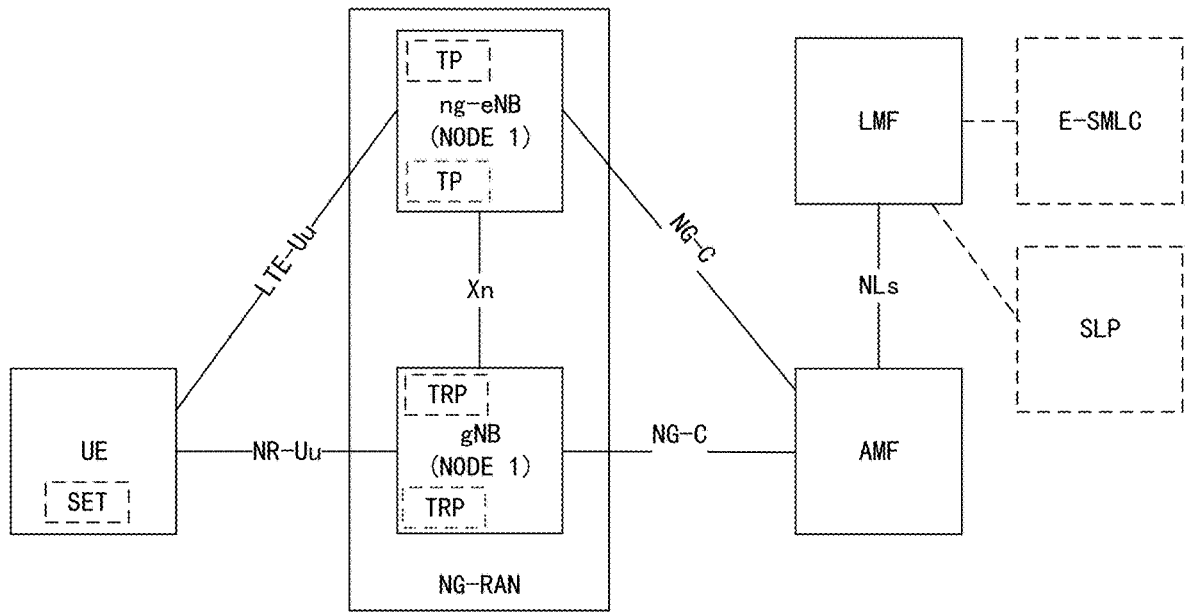
FIG. 1 is a schematic diagram of a positioning architecture suitable for NG-RAN in the section of background.

During the process of research, the following is noticed.

Packet-based data streams are usually bursty. When there is no data transmission, power consumption can be reduced by turning off the UE's receiving circuit, thereby improving battery time. This is the origin of discontinuous reception (DRX). The basic mechanism of DRX is to configure a DRX cycle for UE in an RRC_CONNECTED (RRC: radio resource control) state. The DRX cycle consists of "On Duration" and "Opportunity for DRX". During the "On Duration", the UE monitors and receives a physical downlink control channel (PDCCH) (active period); and during the "Opportunity for DRX", the UE neither receives downlink channel data, nor transmits an uplink reference signal, to reduce power consumption (sleep period).

However, under the current 3GPP architecture, there is no discussion about supporting the terminal to transmit a positioning reference signal during the inactive period of DRX. According to the state of art, after a terminal in the connected state enters the DRX, it cannot send ordinary sounding reference signals (SRS) in the inactive state, and needs to turn off the radio frequency (RF) according to the DRX cycle. However, it is not discussed whether to continue to send and process the positioning reference signal during the period of DRX, so as to facilitate the terminal positioning by the network. It is also necessary to resolve the conflict between these two types of signal processing, that is, to redefine the processing state of the positioning signal in the period of DRX.

Since 5G systems are oriented to vertical industries, positioning services based on mobile communication networks will be used in scenarios such as industrial Internet of Things, telemedicine, and emergency calls. In these different scenarios, the types and forms of terminals are different, and there are also different demands on the power consumption and latency caused by DRX.

Based on the requirements of various positioning scenarios, embodiments of the present disclosure provide a solution based on providing by a terminal a positioning signal processing capability for the DRX state. Through the solution, the positioning server and the serving base station can timely know the terminal's capability related to positioning signal processing during DRX, so as to decide what suitable positioning method to choose, thereby effectively meeting the quality of service (QoS) requirements of positioning service.

The specific implementations of the present disclosure will be described below with reference to the accompanying drawings.

In the description process, the implementation of the UE, the serving base station, and the LMF will be described respectively, and then an example of their coordinated implementation will be given to better understand the implementation of the solutions given in the embodiments of the present disclosure. This description does not mean that they must be implemented together or separately. In fact, when they are implemented separately, they also solve their own problems, and when they are used in combination, better technical effects will be obtained.

Figure 2:
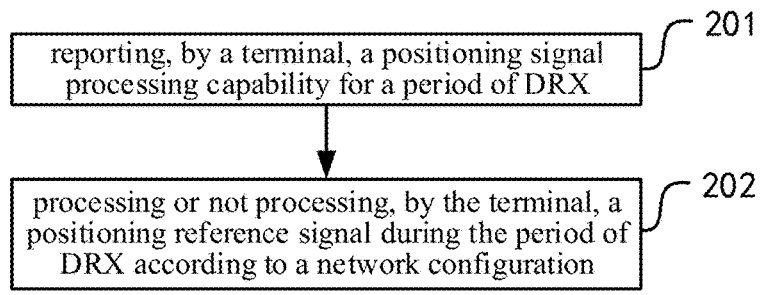
FIG. 2 is a schematic flowchart of a capability reporting method on the terminal side according to an embodiment of the present disclosure.

FIG. 2 is a schematic flowchart of the capability reporting method on the terminal side. As shown in the figure, the capability reporting method includes the following step:

step 201: reporting, by a terminal, a positioning signal processing capability for a period of DRX.

In an implementation, the positioning signal processing capability for the period of DRX is reported by the terminal proactively or in response to a request of a positioning server.

In an implementation, the terminal reports the positioning signal processing capability for the period of DRX to a base station serving the terminal and/or to the positioning server.

In an implementation, the positioning signal processing capability for the period of DRX includes one of or a combination of following capabilities:
  a capability of supporting uplink and downlink positioning signal processing during the period of DRX;
  a capability of supporting uplink positioning signal transmission during the period of DRX;
  a capability of supporting downlink positioning signal processing during the period of DRX;
  a capability of not supporting uplink and downlink positioning signal processing during the period of DRX;
  a capability of not supporting uplink positioning signal transmission during the period of DRX;
  a capability of not supporting downlink positioning signal processing during the period of DRX.

In an implementation, the method further includes:
  step 202, processing or not processing, by the terminal, a positioning reference signal during the period of DRX according to a network configuration.

Figure 3:
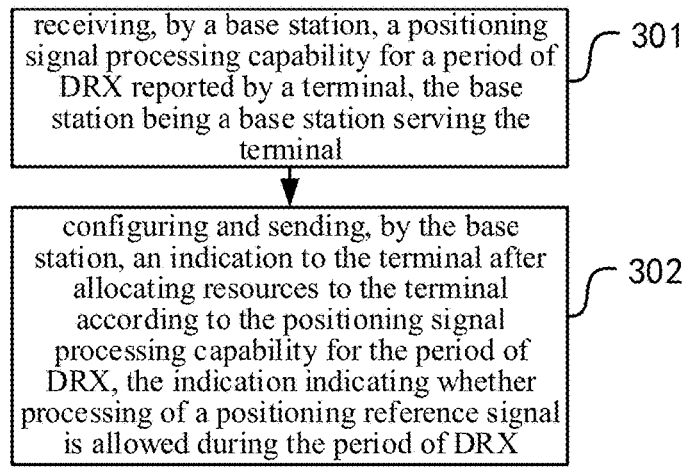
FIG. 3 is a schematic flowchart of a capability report processing method on the base station side according to an embodiment of the present disclosure.

FIG. 3 is a schematic flowchart of the capability report processing method on the base station side. As shown in the figure, the method includes:
  step 301: receiving, by a base station, a positioning signal processing capability for a period of DRX reported by a terminal, the base station being a base station serving the terminal;
  step 302: configuring and sending, by the base station, an indication to the terminal after allocating resources to the terminal according to the positioning signal processing capability for the period of DRX, the indication indicating whether processing of a positioning reference signal is allowed during the period of DRX.

Figure 4:
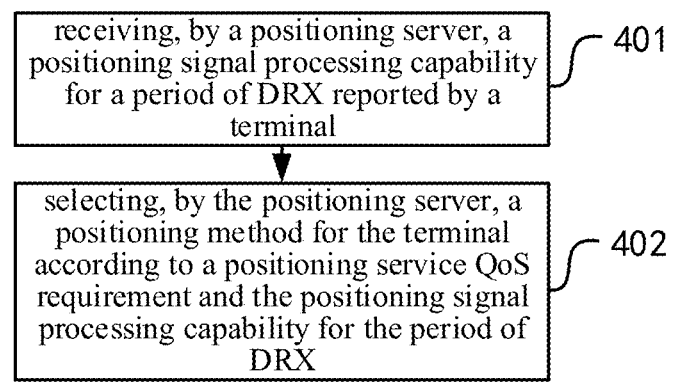
FIG. 4 is a schematic flowchart of a capability report processing method on the LMF side according to an embodiment of the present disclosure.

FIG. 4 is a schematic flowchart of the capability report processing method on the LMF side. As shown in the figure, the method includes:
  step 401: receiving, by a positioning server, a positioning signal processing capability for a period of DRX reported by a terminal;
  step 402: selecting, by the positioning server, a positioning method for the terminal according to a positioning service QoS requirement and the positioning signal processing capability for the period of DRX.

In an implementation, the method may further include:
  configuring the positioning method selected for the terminal to the terminal and the base station.

Specifically, the terminal reports the positioning signal processing capability for the period of DRX to the positioning server LMF and the serving base station. The LMF selects an appropriate positioning method according to the QoS requirements of the positioning service and the terminal capability, and the serving base station selects, according to the terminal capability, appropriate network parameters to configure to the terminal, to implement positioning services. Through the terminal's reporting of the reference signal processing capability for the period of DRX, it is not necessary to require all terminals to support or not support the positioning reference signal processing during the period of DRX, thereby increasing the diversity and processing flexibility of the terminal, and better adapting to the positioning requirements in the 5G vertical field.

A specific implementation can be:

in response to the request of the positioning server, the terminal reports the positioning signal processing capability for a period of DRX; or the terminal-side node proactively reports the positioning signal processing capability for the period of DRX;

the terminal reports the signal processing capability for the period of DRX to the serving base station, which is used by the base station for resource allocation and scheduling.

The positioning signal processing capability for the period of DRX may include one or more of the following:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

After determining the resource allocation, the serving base station configures and sends an indication to the terminal, the indication indicating whether positioning reference signal processing is allowed during the period of DRX.

The terminal processes or does not process a positioning reference signal during the period of DRX according to the network configuration.

Examples are given below.

Embodiment 1

In this example, the positioning server and the serving base station obtain the terminal's capability of supporting signal processing during a period of DRX.

1. In response to the request of the positioning server, the terminal reports the signal processing capability for a period of DRX; or the terminal may proactively report the signal processing capability for the period of DRX for some reasons (such as when initiating a request for positioning assistance information).

The terminal's signal processing capability for the period of DRX may include one or more of the following:

1) a capability of supporting uplink and downlink positioning signal processing during the period of DRX; based on the capability indication, the positioning server can know that the terminal supports continuing processing of positioning reference signals during the period of DRX, and thus, based on QoS service criteria and network conditions, configure an appropriate positioning method, such as a radio access technology (RAT)-based positioning method;

2) a capability of supporting uplink positioning signal processing during the period of DRX; based on the capability indication, the positioning server can know that the terminal supports continuing processing of uplink positioning reference signals during the period of DRX, and thus, based on QoS service criteria and network conditions, configure an appropriate positioning method, such as an RAT-based uplink positioning method;

3) a capability of supporting downlink positioning signal processing during the period of DRX; based on the capability indication, the positioning server can know that the terminal supports continuing processing of downlink positioning reference signals during the period of DRX, and thus, based on QoS service criteria and network conditions, configure an appropriate positioning method, such as an RAT-based downlink positioning method.

2. The positioning server obtains the UE's capability related to supporting signal processing during the period of DRX, and thus configures an appropriate positioning method for the terminal based on QoS service criteria and network conditions. For example, QoS requires low latency, then the LMF configures an RAT-based uplink positioning method. The positioning server performs the next step of positioning.

3. The positioning server configures the uplink positioning method to the terminal and the base station.

The terminal reports, to the serving base station, the capability of supporting signal processing during the period of DRX. The serving base station configures the required positioning reference signal to the terminal in consideration of the terminal's capability, and at the same time configures and sends an indication indicating that positioning reference signal processing is allowed during the period of DRX to the terminal, to trigger the terminal to transmit the reference signal for the uplink positioning method. According to the network configuration and the indication, the positioning terminal still sends or receives the positioning reference signal during inactive period of DRX, and the network receives and measures the positioning reference signals sent by the terminal and report the measurement result to the positioning server LMF.

4. The positioning server performs calculation according to the measurement value reported by the base station, obtains an accurate position of the terminal, and completes this positioning service.

Embodiment 2

In this example, the positioning server and the serving base station obtain the terminal's capability of not supporting signal processing during the period of DRX.

1. In response to the request of the positioning server, the terminal reports the capability of not supporting signal processing during the period of DRX. For some reasons (for example, when initiating a request for positioning assistance information), the terminal may proactively report the capability of not supporting signal processing during the period of DRX.

The terminal's capability of not supporting signal processing during the period of DRX may include one or more of the following:

1) a capability of not supporting uplink and downlink positioning signal processing during the period of DRX; based on the capability indication, the positioning server can know that the terminal does not support continuous processing of positioning reference signals during the period of DRX, and thus, based on QoS service criteria and network conditions, configure an appropriate positioning method, such as an A-GNSS-based positioning method;

2) a capability of not supporting uplink positioning signal processing during the period of DRX; based on the capability indication, the positioning server can know that the terminal does not support continuous processing of uplink positioning reference signals during the period of DRX, and thus, based on QoS service criteria and network conditions, configure an appropriate positioning method, such as an RAT-based downlink positioning method;

3) a capability of not supporting downlink positioning signal processing during the period of DRX; based on the capability indication, the positioning server can know that the terminal does not support continuous processing of downlink positioning reference signals during the period of DRX, and thus, based on QoS service criteria and network conditions, configure an appropriate positioning method, such as an RAT-based uplink positioning method.

2. The positioning server obtains the UE's capability related to signal processing during the period of DRX, and thus configures, based on QoS service criteria and network conditions, an appropriate positioning method for the terminal, such as an RAT-based uplink positioning method, and performs the next step of positioning.

3. The positioning server configures the uplink positioning method to the terminal and the base station.

The terminal reports the capability of not supporting signal processing during the period of DRX to the serving base station. The serving base station configures the required positioning reference signal to the terminal in consideration of the terminal's capability, and at the same time configures and sends an indication indicating that positioning reference signal processing is not allowed during the period of DRX to the terminal, to trigger the terminal to transmit the reference signal for the uplink positioning method. According to the network configuration and the indication, the positioning terminal neither sends nor receives the positioning reference signal during the inactive period of DRX, and the network receives and measures the positioning reference signals sent by the terminal and report the measurement result to the positioning server LMF.

4. The positioning server performs calculation according to the measurement value reported by the base station to obtain the position of the terminal, and completes the positioning service.

Based on the same inventive concept, embodiments of the present disclosure also provide a terminal, a base station, a positioning server, a capability reporting apparatus, capability report processing apparatuses on the base station side and the positioning server side, and a computer-readable storage medium. Since the problem solving principle of these devices is similar to the capability reporting method, and the capability report processing methods on the base station side and the positioning server side, for the implementation of these devices, references may be made to the implementations of the methods, which will be repeated herein.

When implementing the technical solutions provided by the embodiments of the present disclosure, it can be implemented as follows.

Figure 5:
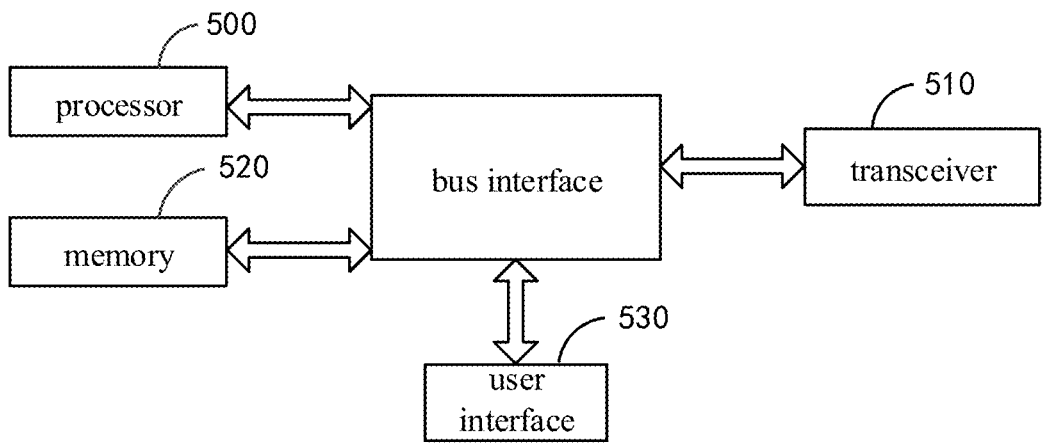
FIG. 5 is a schematic structural diagram of a terminal according to an embodiment of the present disclosure.

FIG. 5 is a schematic structural diagram of a terminal, as shown in the figure, including:

a processor 500, configured to read a program in a memory 520 to implement the following process:

reporting a positioning signal processing capability for a period of DRX;

a transceiver 510, configured to receive and transmit data under the control of the processor 500.

In an implementation, the positioning signal processing capability for the period of DRX is reported by the terminal proactively or in response to a request of a positioning server.

In an implementation, the positioning signal processing capability for the period of DRX is reported to a base station serving the terminal and/or to the positioning server.

In an implementation, the positioning signal processing capability for the period of DRX comprises one of or a combination of following capabilities:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In an implementation, the processor 500 is configured to read the program in the memory 520 to further implement:

processing or not processing a positioning reference signal during the period of DRX according to a network configuration.

In FIG. 5, the bus architecture may include any number of interconnected buses and bridges, specifically various circuits such as one or more processors represented by the processor 500 and the memory represented by the memory 520 are connected together. The bus architecture can also connect various other circuits such as peripheral devices, voltage regulators, power management circuits, etc., which are all known in the field, and therefore, will not be further described herein. The bus interface provides the interface. The transceiver 510 may be a plurality of elements, that is, including a transmitter and a receiver, and provide a unit for communicating with various other devices on the transmission medium. For different UEs, a user interface 530 may also be an interface capable of connecting externally or internally to required equipment. The connected equipment includes, but is not limited to, a keypad, a display, a speaker, a microphone, a joystick, etc.

The processor 500 is responsible for managing the bus architecture and general processing, and the memory 520 can store data used by the processor 500 when performing operations.

Figure 6:
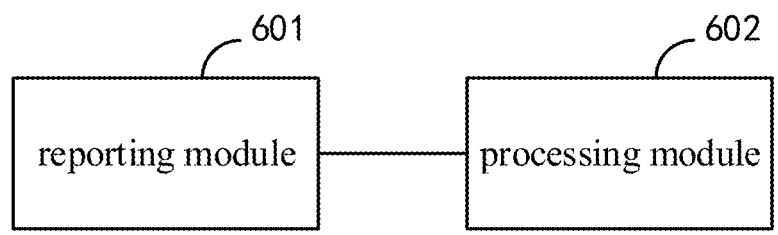
FIG. 6 is a schematic structural diagram of a capability reporting apparatus according to an embodiment of the present disclosure.

FIG. 6 is a schematic structural diagram of a capability reporting apparatus, as shown in the figure, including:

a reporting module 601, configured to report a positioning signal processing capability for a period of DRX.

In an implementation, the reporting module is further configured to report the positioning signal processing capability for the period of DRX proactively, or report the positioning signal processing capability for the period of DRX in response to a request of a positioning server.

In an implementation, the reporting module is further configured to report the positioning signal processing capability for the period of DRX to a base station serving the terminal and/or report the positioning signal processing capability for the period of DRX to the positioning server.

In an implementation, the reporting module is further configured to report one of or a combination of the following positioning signal processing capabilities for the period of DRX:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In an implementation, the capability reporting apparatus further includes:

a processing module 602, configured to process or not process the positioning reference signal during the period of DRX according to a network configuration.

For the convenience of description, each part of the device described above is divided into various modules or units by function and described respectively. Of course, when implementing the present disclosure, the functions of each module or unit may be implemented in one or more pieces of software or hardware.

Figure 7:
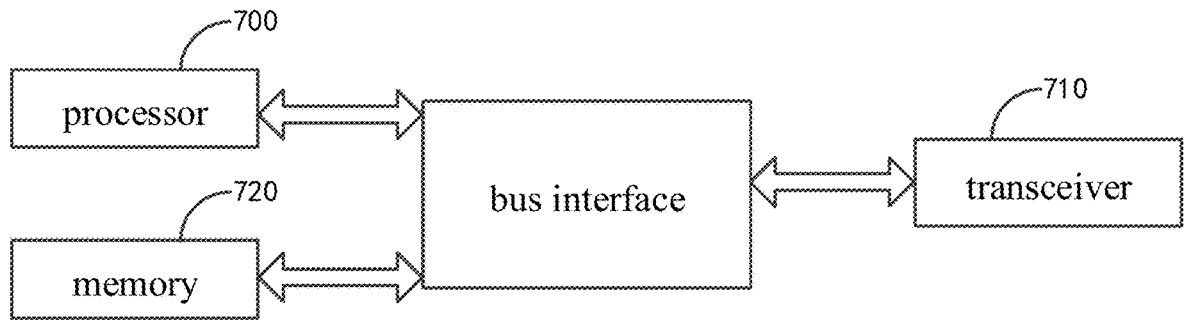
FIG. 7 is a schematic structural diagram of a base station according to an embodiment of the present disclosure.

FIG. 7 is a schematic structural diagram of a base station. As shown in the figure, the base station includes:

a processor 700, configured to read a program in a memory 720 to implement following process:

receiving a positioning signal processing capability for a period of DRX reported by a terminal, the base station being a base station serving the terminal;

configuring and sending an indication to the terminal after allocating resources to the terminal according to the positioning signal processing capability for the period of DRX, the indication indicating whether processing of a positioning reference signal is allowed during the period of DRX;

a transceiver 710, configured to receive and transmit data under the control of the processor 700.

In an implementation, the positioning signal processing capability for the period of DRX includes one of or a combination of following capabilities:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In FIG. 7, the bus architecture may include any number of interconnected buses and bridges, specifically various circuits such as one or more processors represented by the processor 700 and the memory represented by the memory 720 are connected together. The bus architecture can also connect various other circuits such as peripheral devices, voltage regulators, power management circuits, etc., which are all known in the field, and therefore, will not be further described herein. The bus interface provides the interface. The transceiver 710 may be a plurality of elements, that is, including a transmitter and a receiver, and provide a unit for communicating with various other devices on the transmission medium. The processor 700 is responsible for managing the bus architecture and general processing, and the memory 720 can store data used by the processor 700 when performing operations.

Figure 8:
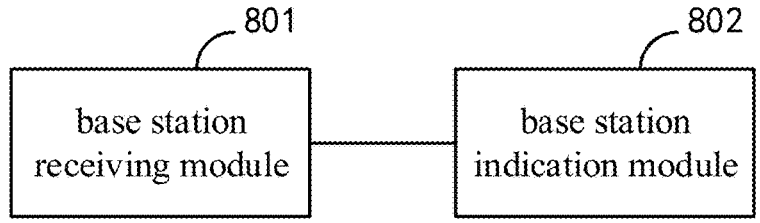
FIG. 8 is a schematic structural diagram of a capability report processing apparatus on the base station side according to an embodiment of the present disclosure.

FIG. 8 is a schematic structural diagram of a capability report processing apparatus on the base station side, as shown in the figure, including:

a base station receiving module 801, configured to receive a positioning signal processing capability for a period of DRX reported by a terminal, the base station being a base station serving the terminal;

a base station indication module 802, configured to configure and send an indication to the terminal after allocating resources to the terminal according to the positioning signal processing capability for the period of DRX, the indication indicating whether processing of a positioning reference signal is allowed during the period of DRX.

In an implementation, the base station receiving module is further configured to receive one of or a combination of the following positioning signal processing capabilities for the period of DRX:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

For the convenience of description, each part of the device described above is divided into various modules or units by function and described respectively. Of course, when implementing the present disclosure, the functions of each module or unit may be implemented in one or more pieces of software or hardware.

Figure 9:
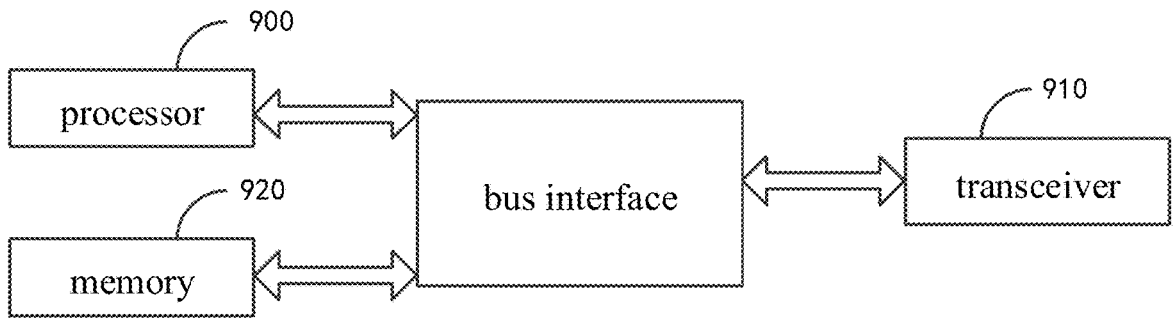
FIG. 9 is a schematic structural diagram of a positioning server according to an embodiment of the present disclosure.

FIG. 9 is a schematic structural diagram of a positioning server. As shown in the figure, the positioning server includes:

a processor 900, configured to read a program in a memory 920 to implement following process:

receiving the positioning signal processing capability for a period of DRX reported by the terminal;

selecting a positioning method for the terminal according to a positioning service QoS requirement and the positioning signal processing capability for the period of DRX;

a transceiver 910, configured to receive and transmit data under the control of the processor 900.

In an implementation, the positioning signal processing capability for the period of DRX is proactively reported by the terminal, or is reported by the terminal in response to a request of the positioning server.

In an implementation, the positioning signal processing capability for the period of DRX comprises one of or a combination of following capabilities:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In an implementation, the processor 900 is configured to read the program in the memory 920 to further implement:

configuring the positioning method selected for the terminal to the terminal and the base station.

In FIG. 9, the bus architecture may include any number of interconnected buses and bridges, specifically various circuits such as one or more processors represented by the processor 900 and the memory represented by the memory 920 are connected together. The bus architecture can also connect various other circuits such as peripheral devices, voltage regulators, power management circuits, etc., which are all known in the field, and therefore, will not be further described herein. The bus interface provides the interface. The transceiver 910 may be a plurality of elements, that is, including a transmitter and a receiver, and provide a unit for communicating with various other devices on the transmission medium. The processor 900 is responsible for managing the bus architecture and general processing, and the memory 920 can store data used by the processor 900 when performing operations.

Figure 10:
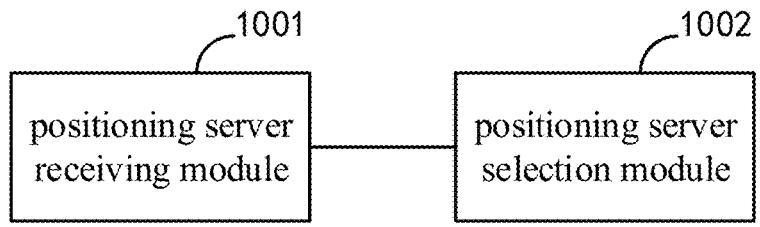
FIG. 10 is a schematic structural diagram of a capability report processing apparatus on the positioning server side according to an embodiment of the present disclosure.

FIG. 10 is a schematic structural diagram of a capability report processing apparatus on the positioning server side, as shown in the figure, including:

a positioning server receiving module 1001, configured to receive the positioning signal processing capability for the period of DRX reported by a terminal;

a positioning server selection module 1002, configured to select a positioning method for the terminal according to a positioning service QoS requirement and the positioning signal processing capability for the period of DRX.

In an implementation, the positioning server receiving module is further configured to receive the positioning signal processing capability for the period of DRX reported by the terminal proactively or the positioning signal processing capability for the period of DRX reported by the terminal in response to a request of the positioning server.

In an implementation, the positioning server receiving module is further configured to receive one of or a combination of the following positioning signal processing capabilities for the period of DRX:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

In an implementation, the capability report processing apparatus further includes:

a configuration module, configured to configure the positioning method selected for the terminal to the terminal and the base station.

For the convenience of description, each part of the device described above is divided into various modules or units by function and described respectively. Of course, when implementing the present disclosure, the functions of each module or unit may be implemented in one or more pieces of software or hardware.

An embodiment of the present disclosure provides a computer-readable storage medium, where the computer-readable storage medium stores a computer program configured to implement the foregoing capability reporting method and/or capability report processing methods.

For details, references may be made to the implementations of the capability reporting method and/or the capability report processing methods on the base station side and the positioning server side.

To sum up, in the technical solutions provided by the embodiments of the present disclosure, the terminal reports the positioning signal processing capability for the period of DRX to the positioning server LMF and the serving base station. The LMF selects an appropriate positioning method according to the QoS requirements of the positioning service and the terminal capability, and the serving base station selects the appropriate network parameters according to the terminal capability to configure to the terminal, to implement the positioning service. Through the terminal's reporting of the reference signal processing capability for the period of DRX, it is not necessary to require all terminals to support or not support the positioning reference signal processing during the period of DRX, thereby increasing the diversity and processing flexibility of the terminal, and better adapting to the positioning requirements in the 5G vertical field.

Specifically, based on the request of the positioning server, the terminal reports the positioning signal processing capability for a period of DRX; or the terminal side node proactively reports the positioning signal processing capability for the period of DRX;

the terminal reports the signal processing capability for the period of DRX to the serving base station, which is used by the base station for resource allocation and scheduling.

The positioning signal processing capability for the period of DRX includes one or more of the following:

a capability of supporting uplink and downlink positioning signal processing during the period of DRX;

a capability of supporting uplink positioning signal transmission during the period of DRX;

a capability of supporting downlink positioning signal processing during the period of DRX;

a capability of not supporting uplink and downlink positioning signal processing during the period of DRX;

a capability of not supporting uplink positioning signal transmission during the period of DRX;

a capability of not supporting downlink positioning signal processing during the period of DRX.

After determining the resource allocation, the serving base station configures and sends an indication indicating whether positioning reference signal processing is allowed during the period of DRX to the terminal.

The terminal processes or does not process a positioning reference signal during the period of DRX according to the network configuration.

Through this solution, the positioning server can timely know the terminal's capability related to whether reference signal processing is supported during DRX, so as to assist in completing the determination of the positioning method. Through this solution, the base station obtains the terminal's related capabilities and configures appropriate network parameters, thereby better supporting the positioning requirements of various 5G terminals. Through the terminal's reporting of the capability related to reference signal processing during the period of DRX, it is not necessary to require all terminals to support or not support the positioning reference signal processing during the period of DRX, thereby increasing the diversity and processing flexibility of the terminal, and better adapting to the positioning requirements in the 5G vertical field.

A person skilled in the art can understand that embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product implemented on one or more computer-usable storage mediums (including but not limited to disk storage, optical storage, etc.) storing computer-usable program code therein.

The present disclosure is described with reference to flowcharts and/or block diagrams of methods, devices (systems), and computer program products according to the embodiments of the disclosure. It will be understood that each process and/or block in the flowcharts and/or block diagrams, and combinations of processes and/or blocks in the flowcharts and/or block diagrams, can be implemented by computer program instructions. These computer program instructions may be provided to the processor of a general-purpose computer, special purpose computer, embedded processor or other programmable data processing device to produce a machine such that the instructions executed by the processor of the computer or other programmable data processing device produce an apparatus for implementing the functions specified in one or more processes in the flowcharts and/or one or more blocks in the block diagrams.

These computer program instructions may also be stored in a computer readable memory capable of directing a computer or other programmable data processing device to operate in a particular manner, such that the instructions stored in the computer readable memory produce an article of manufacture including an instruction device that implements the functions specified in one or more processes in a flowchart and/or one or more blocks in a block diagram.

These computer program instructions may also be loaded to a computer or other programmable data processing device such that a series of operational steps are executed on the computer or other programmable device to produce computer-implemented processing, so that the instructions executed on the computer or other programmable device provide steps for implementing the functions specified in in one or more processes in a flowchart and/or one or more blocks in a block diagram.

The terms "first", "second", etc. in the description and claims of the present disclosure are used to distinguish similar objects and are not necessarily used to describe a specific order or sequence. It should be understood that the data so used may be interchanged under appropriate circumstances so that the embodiments of the application described herein, such as those illustrated or described herein, are implemented in sequences other than those illustrated or described herein. Furthermore, the terms "comprising" and "having", and any variations thereof, are intended to cover non-exclusive inclusion, for example, a process, method, system, product or device comprising a series of steps or units is not necessarily limited to those steps or units clearly listed, but may include those not clearly listed. but may include other steps or units not clearly listed or inherent to those processes, methods, products, or devices. In addition, the specification and claims use "and/or" to denote at least one of the connected objects, e.g., A and/or B and/or C indicates the seven cases comprising A alone, B alone, C alone, and A and B together, B and C together, A and C together, and A, B, and C all. Similarly, the use of "at least one of A or B" in this specification and in the claims is to be understood as "A alone, B alone, or A and B together".

It should be pointed out that for a person skilled in the art, several improvements and modifications can be made without departing from the principles of the present disclosure. The present disclosure intends to encompass these improvements and modifications if they fall within the scope of the claims of the present disclosure and equivalents thereof.

What is claimed is:

1. A capability reporting method, comprising:
    reporting, by a terminal, proactively a positioning signal processing capability for a period of discontinuous reception (DRX) to a base station serving the terminal and/or to a positioning server; or,
    reporting, by the terminal, in response to a request of the positioning server, the positioning signal processing capability for the period of DRX to the base station serving the terminal and/or to the positioning server;
    wherein the positioning signal processing capability for the period of DRX comprises one or more of following:
    the terminal's capability of supporting uplink positioning signal processing during the period of DRX;
    the terminal's capability of supporting uplink positioning signal transmission during the period of DRX;
    the terminal's capability of supporting downlink positioning signal processing during the period of DRX;
    the terminal's capability of not supporting uplink positioning signal processing during the period of DRX:
    the terminal's capability of not supporting uplink positioning signal transmission during the period of DRX;
    the terminal's capability of not supporting downlink positioning signal processing during the period of DRX.

2. The capability reporting method according to claim 1, further comprising:
    processing or not processing, by the terminal, a positioning reference signal during the period of DRX according to a network configuration.

3. A capability report processing method, comprising:
    receiving, by a base station, a positioning signal processing capability for a period of DRX reported by a terminal, the base station being a base station serving the terminal;
    allocating, by the base station, resources to the terminal according to the positioning signal processing capability for the period of DRX, and configuring an indication to the terminal, the indication indicating whether processing of a positioning reference signal is allowed during the period of DRX;
    wherein the positioning signal processing capability for the period of DRX comprises one or more of following:
    the terminal's capability of supporting uplink positioning signal processing during the period of DRX;
    the terminal's capability of supporting uplink positioning signal transmission during the period of DRX:
    the terminal's capability of supporting downlink positioning signal processing during the period of DRX;
    the terminal's capability of not supporting uplink positioning signal processing during the period of DRX;
    the terminal's capability of not supporting uplink positioning signal transmission during the period of DRX;
    the terminal's capability of not supporting downlink positioning signal processing during the period of DRX.

4. A capability report processing method, comprising:
receiving, by a positioning server, a positioning signal processing capability for a period of DRX reported by a terminal, wherein the positioning signal processing capability for the period of DRX is proactively reported by the terminal, or is reported by the terminal in response to a request of the positioning server;
selecting, by the positioning server, a positioning method for the terminal according to a positioning service quality of service (QOS) requirement and the positioning signal processing capability for the period of DRX;
wherein the positioning signal processing capability for the period of DRX comprises one or more of following:
the terminal's capability of supporting uplink positioning signal processing during the period of DRX;
the terminal's capability of supporting uplink positioning signal transmission during the period of DRX;
the terminal's capability of supporting downlink positioning signal processing during the period of DRX;
the terminal's capability of not supporting uplink positioning signal processing during the period of DRX;
the terminal's capability of not supporting uplink positioning signal transmission during the period of DRX;
the terminal's capability of not supporting downlink positioning signal processing during the period of DRX.

5. The capability report processing method according to claim 4, further comprising:
configuring a positioning method selected for the terminal to the terminal and a base station.

6. A terminal, comprising:
a processor, configured to read a program in a memory to implement the steps of the method according to claim 1;
a transceiver, configured to receive and transmit data under the control of the processor.

7. The terminal according claim 6, further comprising:
processing or not processing a positioning reference signal during the period of DRX according to a network configuration.

8. A base station, comprising:
a processor, configured to read a program in a memory to implement the steps of the method according to claim 3;
a transceiver, configured to receive and transmit data under the control of the processor.

9. A positioning server, comprising:
a processor, configured to read a program in a memory to implement the steps of the method according to claim 4;
a transceiver, configured to receive and transmit data under the control of the processor.

10. The positioning server according to claim 9, further comprising:
configuring the positioning method selected for the terminal to the terminal and a base station.

11. A non-transitory computer-readable storage medium, wherein the non-transitory computer-readable storage medium stores a computer program configured to implement the method according to claim 1.

12. A non-transitory computer-readable storage medium, wherein the non-transitory computer-readable storage medium stores a computer program configured to implement the method according to claim 3.

13. A non-transitory computer-readable storage medium, wherein the non-transitory computer-readable storage medium stores a computer program configured to implement the method according to claim 4.

* * * * *